United States Patent [19]

Smet

[11] Patent Number: 5,184,919
[45] Date of Patent: Feb. 9, 1993

[54] METHOD FOR WIDENING A HOLE OR A PIPE IN THE GROUND

[75] Inventor: Marc J. M. Smet, Mol, Belgium

[73] Assignee: Corstjens Helena Michel, Mol, Belgium

[21] Appl. No.: 540,495

[22] Filed: Jun. 19, 1990

[30] Foreign Application Priority Data

Jun. 22, 1989 [BE] Belgium ................................ 8900687

[51] Int. Cl.⁵ .............................................. F16L 1/00
[52] U.S. Cl. ...................................... 405/154; 405/156
[58] Field of Search .............. 405/154, 156, 150, 259, 405/289; 138/97; 29/523, 522.1

[56] References Cited

U.S. PATENT DOCUMENTS

| | | | |
|---|---|---|---|
| 2,830,443 | 4/1958 | Burrell | 405/237 |
| 3,164,964 | 1/1965 | Josephson | 405/237 X |
| 3,509,725 | 5/1970 | Schnabel | 405/150 |
| 3,665,719 | 5/1972 | Whiting | 405/259 X |
| 4,124,985 | 11/1978 | Maimets | 405/150 |
| 4,487,528 | 12/1984 | Skogberg | 405/259 |
| 4,767,236 | 8/1988 | Rice | 405/154 |
| 4,770,256 | 9/1988 | Lipsker et al. | 405/150 X |

FOREIGN PATENT DOCUMENTS

| | | | |
|---|---|---|---|
| 217410 | 10/1961 | Austria | 405/289 |
| 0190933 | 8/1986 | European Pat. Off. | |
| 0251607 | 1/1988 | European Pat. Off. | |
| 1220367 | 7/1966 | Fed. Rep. of Germany | 405/289 |
| 438180 | 11/1967 | Switzerland | |
| 0848651 | 7/1981 | U.S.S.R. | 405/289 |
| 0883522 | 11/1981 | U.S.S.R. | 405/289 |
| 2139671A | 11/1984 | United Kingdom | |

OTHER PUBLICATIONS

Europower "Flexible pressure Hose" 1988 (United Kingdom) pp. 11, 14, 15.

*Primary Examiner*—Dennis L. Taylor
*Attorney, Agent, or Firm*—Foley & Lardner

[57] ABSTRACT

Procedure for the enlargement of the passage of a pipe (2) in the ground (1), according to which procedure this pipe (2) in the ground (1) is pushed open, characterized in that in the pipe (2) at least one high pressure hose (3) is installed, which, in condition filled by fluid under high pressure, is thicker than the inside of the pipe (2), but in another state without this high pressure, can be brought into the pipe, the high pressure hose (3) is put under pressure with fluid under high pressure until the pipe (2) expands after which the pressure of the fluid (4) in the high pressure hose (3) is lowered.

10 Claims, 3 Drawing Sheets

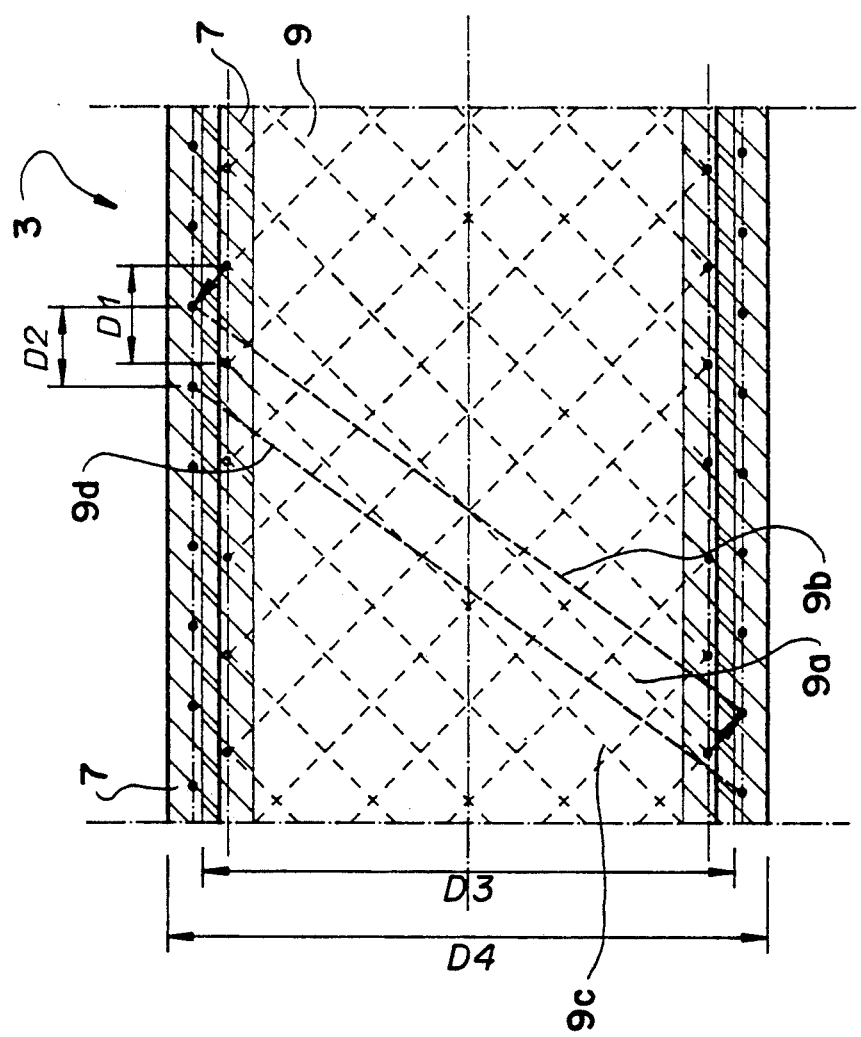

METHOD FOR WIDENING A HOLE OR A PIPE IN THE GROUND

The invention relates to a procedure for the enlargement of the passage in the ground, according to which procedure this passage in the ground is pushed open.

Ground must here be understood in wide sense, so that under this both earth, sand and rocks must be included.

The passage can be both a hole already drilled and the passage through a pipe already installed in the ground. A known procedure for the enlargement of the diameter of such a hole consists in pulling an enlarging bit through this hole. This however requires that the hole is accessible at both extremities. This procedure cannot be utilized if the passage terminates in the ground and therefore has a closed extremity.

This known procedure is also not suitable for applications whereby a passage must be widened as the enlargement of the passage of a pipe in the ground.

It often occurs that a pipe, for example a sewage pipe, in the ground must be replaced. It is obvious to take the pipe to be replaced out of the ground and to place another pipe therein. For this purpose a trench must be dug in the ground which obviously is very time-consuming.

Another known procedure consists in installing a supple hose as a lining. The thus lined defective pipe now becomes usable again. The installation of this lining however requires the utilization of special devices and is time-consuming and expensive.

Yet another known procedure, of the type to which the present application relates, consists in leaving the pipe in the ground but enlarging its passage. According to a known procedure of this type a wheeled device which is moved progressively is installed in the pipe and with each step pushes open the pipe by means of hydraulic pushing devices moved apart for example until it breaks. This procedure also requires the use of a special and relatively expensive device. Because the pipe must be pushed open gradually this procedure is also time-consuming.

The purpose of the invention is to remedy these disadvantages and to provide a procedure for the widening of a passage in the ground which is very simple and can be performed quickly, and which is particularly suitable for the enlargement of the passage of a pipe in the ground.

For this purpose at least one high pressure hose is brought into the passage which, in condition filled with fluid under high pressure, is thicker than the inside of the passage but in another condition without this high pressure, can be brought into the passage, the high pressure hose is put under pressure with a fluid under high pressure until the passage expands, after which the pressure of the fluid in the high pressure hose is reduced.

By high pressure hose here a hose is meant which can withstand pressures of 100 bars and more and which, when it is filled with fluid under pressure, takes on a maximum predeterminable diameter. This maximum diameter depends upon the construction of the hose and can not be exceeded by high pressure of the fluid. Local bulges even there where the high pressure hose is free and not stuck in a passage, are excluded.

The above mentioned properties are obtained because a fabric is worked into the wall of the hose as will be described in greater detail further in the application.

The expansion can be formed by a plastic transformation if the material that confines the passage is plastically transformable as well as be coupled with or even be formed by the breaking of this material if it is not or not sufficiently plastically transformable.

In a suitable embodiment of the invention, at least two high pressure hoses are brought into the passage next to each other, whereby the theoretical curved surface which surrounds the high pressure hoses, when they are put under pressure with fluid under pressure and fit closely against each other, is thicker than the inside of the passage, these high pressure hoses are brought under pressure with fluid under high pressure until the passage expands, after which the pressure of the fluid in the high pressure hoses is lowered.

In a preferably applied embodiment of the invention, the high pressure hose is held in compressed state by means of a transformable covering for the installation in the passage.

This embodiment is particularly advantageous if two or more high pressure hoses are installed in the passage simultaneously. Holding the hose or hoses compressed usually requires a certain force. The covering facilitates the installation of the hose or hoses without preventing this hose or these hoses from again taking on their normal form when the fluid under high pressure is pushed in there.

A particularly advantageous application of the above described procedure consists in enlarging the passage of a pipe already installed in the ground. In this case the passage is therefore the passage of the pipe. With the expansion the pipe can transform plastically or break depending on whether it is transformable or not.

Once the pipe has expanded, either the high pressure hose itself can be utilized as new pipe, or a new pipe or cable or tube can be installed in the high pressure hose after the removal of the fluid, or the high pressure hose can still be removed from the expanded pipe after the removal of the high pressure and the new pipe, the cable or the tube can be installed in the pipe.

Another special application of the above described procedure consists in enlarging a passage drilled in a rock in order so to break this rock. The application of the procedure can therefore replace the use of explosives.

The invention also relates to a high pressure hose obviously intended to be utilized with the application of the procedure according to one of the preceding embodiments.

Other details and advantages of the invention will appear from the following description of a procedure for the enlargement of the passage of a pipe in the ground and of a high pressure hose utilized with it according to the invention; this description is only given as an example and does not limit the invention; the reference numbers relate to the drawings attached hereto.

FIG. 8 is a cross-sectional view of a portion of the inventive high pressure hose showing the location of the threads (in fine lines) while at rest and the resulting positioning of two adjacent thread windings (in thicker lines) when the hose is under pressure.

In the various figures the same reference numbers relate to the same elements.

Figure 1:
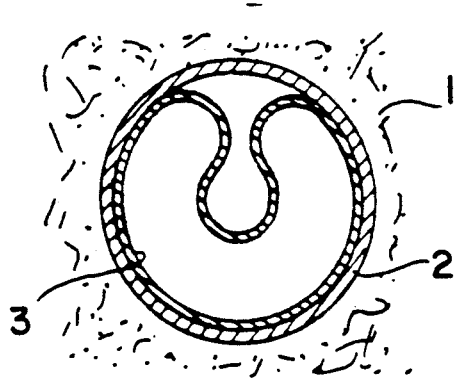
FIG. 1 represents a cross-section of a pipe in which a high pressure hose was installed for the application of the procedure according to the invention.
Figure 2:
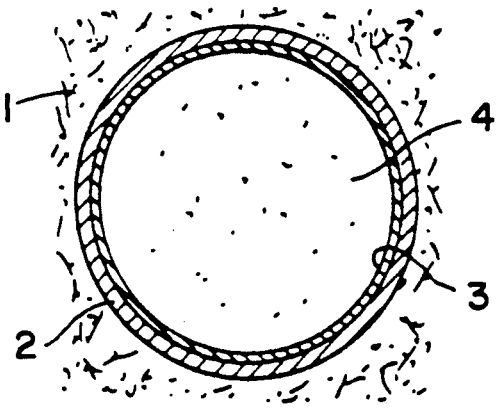
FIG. 2 represents a cross-section of the pipe with high pressure hose from FIG. 1 but after the procedure according to the invention was already largely applied.

In order to expand a plastically transformable pipe 2, for example of lead, located in the ground 1, the following procedure will be effected as illustrated on the basis of the FIGS. 1 and 2.

A high pressure hose 3 is installed in the pipe 2. This high pressure hose is formed of several layers of elastic material 7, for example polyethylene and contains at least one innermost layer of a fabric of nonelastic thread 9. This fabric is so weaved around the axis of the hose that the threads or bundles of threads from an angle with a surface perpendicular to this axis. When no high pressure prevails in the high pressure hose 3 this has an outer diameter which is smaller than the inner diameter of the pipe 2. When a fluid is brought into the high pressure hose 3 which is sealed off at one extremity and this hose 3 is slowly pumped up, the pressure increases in the hose 3 and will expand this to a maximum predetermined diameter which depends upon the fabric. The layers of elastic material of the hose 3 expand easily. The fabric which forms an inner hose can, because the threads are not elastic, only expand through the fact that the threads are moved toward each other and are directed less obliquely to a theoretical surface perpendicular to the axis of the hose 3. The maximum diameter of the fabric is therefore limited and determines the maximum possible expansion of the entire high pressure hose 3. With the increase in diameter of the layer formed by the fabric referred to above the length thereof will decrease through which the length of the entire high pressure hose 3 slightly decreases. The increase of the diameter of the high pressure hose 3 is homogeneous and constant over the whole length because of the symmetric fabric. FIG. 8 reflects how the threads in the high pressure hose move when subjected to pressure. That is, because of the oblique orientation of the threads, and their nonelastic nature, when the hose is subjected to pressure it cannot expand in the longitudinal direction. However, as the elastic portion of the hose expands radially outward due to the pressure, the threads that cross each other pivot toward each other until they reach a point where the nonelastic threads prevent further radial expansion. Therefore, thread 9a, for example, will rotate into the position 9b when subjected to pressure, forming a less oblique angle with a theoretical surface perpendicular to the axis of hose 3. On the other hand, as thread 9c which is adjacent to thread 9b rotates into its 9c position, the distance D1 between threads 9a becomes a smaller value D2, which reflects the shortening of the length of the hose as it expands radially.

The maximum diameter of the high pressure hose 3 referred to above, thus when this hose is put under pressure with fluid under pressure, must be greater than the inner diameter of the pipe 2.

The high pressure hose 3 is installed in the pipe 2 by pushing the high pressure hose 3 into one extremity of the pipe 2 or by pulling this hose through this pipe 2 by means of a cable installed beforehand in a known manner through the pipe 2. One extremity of the hose is sealed off and the high pressure hose 3 is pumped up with oil 4 via the other extremity, through which this high pressure hose 3 takes on its maximum diameter and, since this is greater than the inner diameter of the pipe 2, causes this pipe 2 to expand. The high pressure to which the hose must be pumped up depends upon the material of the pipe 2. The pressure must be greater than the elasticity of the pipe 2. The smaller the diameter of the high pressure hose 3, the greater can be the maximum permitted pressure in the hose. This pressure can rise up to 7000 bars. Normally the pressure lies between 100 and 1000 bars.

After the expansion of the pipe 2 the pressure is allowed out of the high pressure hose 3. The pipe can at once expand over its entire length or, for example with a very long pipe 2, progressively, whereby the high pressure hose 3 is installed over a distance in the pipe 2 and the pipe 2 is expanded over this distance, after the lowering of the pressure the hose 3 is further moved over an additional distance and the pipe 2 is expanded over this additional distance and so on. After the expansion of the pipe the high pressure hose 3 can be left in the pipe 2 and, either be utilized as new pipe, or a new pipe, a tube or a cable can be installed through this hose in a known manner. The high pressure hose 3 can also be removed from the expanded pipe 2 and then a new pipe, a tube or a cable can be installed in this expanded pipe 2 in a known manner.

Figure 3:
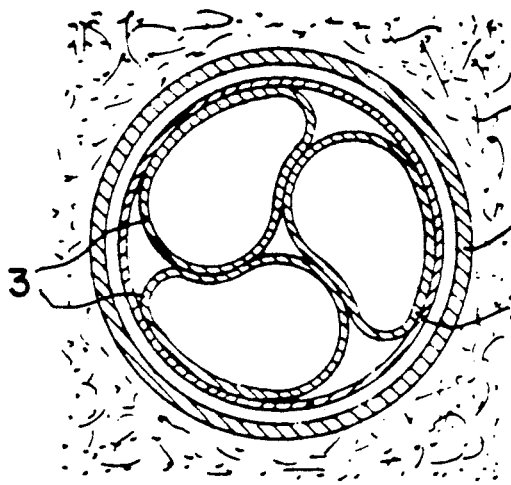
FIG. 3 represents a cross-section analogue to that from FIG. 1 of a pipe in which three high pressure hoses surrounded by an elastic covering were installed for the application of another embodiment of the procedure according to the invention.
Figure 4:
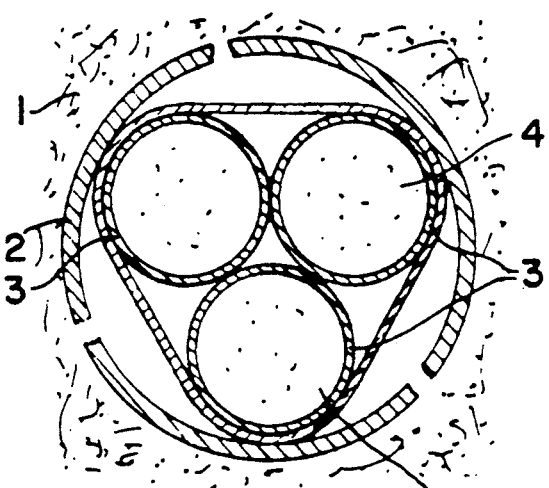
FIG. 4 represents a cross-section of the pipe with the high pressure hoses and covering from FIG. 3, but in a further stage of the application of the procedure according to the invention.

The embodiment of the procedure to which FIGS. 3 and 4 relate, differs from the embodiment described above, on the one hand, because a pipe 2 which is not transformable is expanded until it breaks and, on the other hand because not one but three high pressure hoses 3 are installed in compressed state in the pipe 2.

In order to be able to install these three high pressure hoses 3 easily in compressed state into the pipe 2, these hoses are surrounded beforehand with a transformable covering 5 that for example can be manufactured of rubber or steel.

The three high pressure hoses 3 are pumped up with oil under pressure 4 whereby the pressures can even be a little higher than the above described embodiment namely between 100 and 3000 bars.

The three high pressure hoses 3 will under pressure take on a round form with predetermined maximum diameter as represented in FIG. 4 whereby these hoses were of course so selected that the theoretical curved surface which surrounds the hoses 3 fitting against each other with maximum diameter has a diameter which is greater than the inner diameter of the untransformed pipe 2.

This means that, since the pipe 2 is not transformable, this pipe is going to break. In FIG. 4 the pipe 2 is represented in broken condition. The covering 5 must of course be able to transform sufficiently in order to allow the hoses 3 to take on their maximum thickness.

Also with the last mentioned embodiment the high pressure hoses 3 can be left in place together with the covering 5 and these hoses can be utilized as pipes, or new pipes or tubes can be installed through these hoses, but usually the high pressure hoses 3 with the covering 5 will be removed from the broken pipe 2 after which a new pipe or tubes or a cable can then be installed in a known manner in this pipe 2.

The pipe 2 can in this manner be replaced over any arbitrary length.

Figure 5:
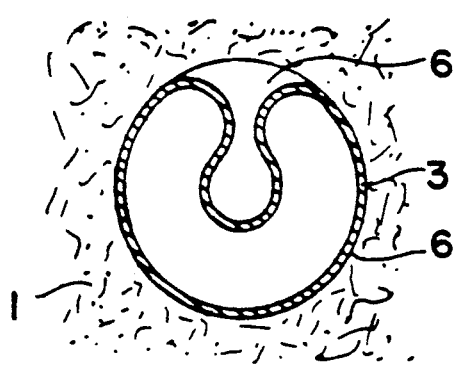
FIG. 5 shows a cross-section through a passage in the ground during the application of the procedure according to the invention.
Figure 6:
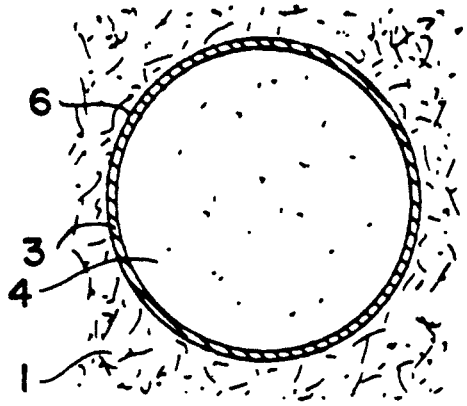
FIG. 6 shows a cross-section analogue to that from FIG. 5 but in a further phase of the application of the procedure.
Figure 7:
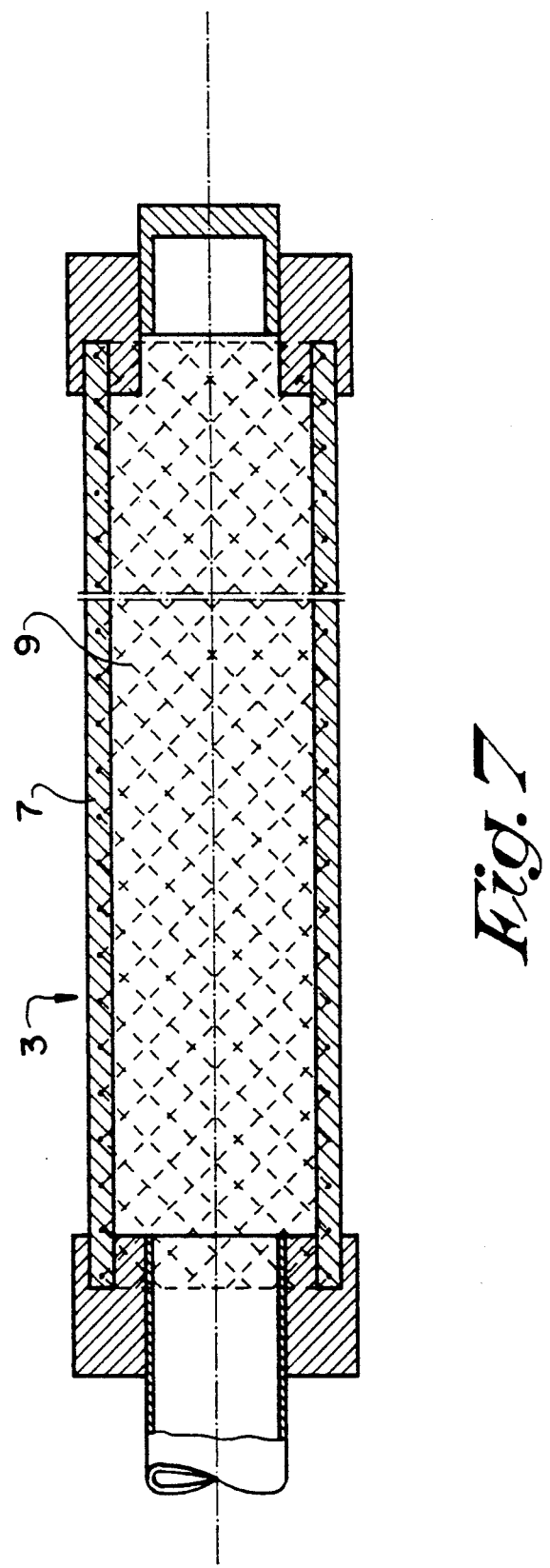
FIG. 7 is a cross-sectional view of a high pressure hose as used to practice the invention.

The embodiment of the procedure to which FIGS. 5 and 6 relate differs from the above described embodiment to which FIGS. 1 and 2 relate only because the pipe 2 is absent.

Therefore, before it is formed with fluid 4 under high pressure, the high pressure hose 3 is installed directly in a drilled hole 6 in the ground. In state filled by fluid under pressure the high pressure hose 3 is wider than the drill hole 6 so that putting this high pressure hose 3 under pressure expands the drill hole 6.

If the ground is relatively soft the ground around the drill hole 6 will be compressed. If it is hard, is for example rock, this ground will burst open and or break. So an advantageous application of the procedure consists in expanding drill holes in a rock until this rock breaks, this instead of the use of explosives for breaking the rock.

Instead of one single high pressure hose 3 several high pressure hoses 3 can also be installed in the drill hole 6 as with the above described embodiment to which FIG. 3 relates.

The above described procedure is rather simple and quick to perform. Possible interruptions in the pipe 2 can be overcome without problems. High pressure hoses always have the property of not bulging out even when they are put under pressure, even there where they are not surrounded by a pipe.

The above described procedure can, if required, be repeated twice or several times after each other whereby in each case a thicker high pressure hose or thicker high pressure hoses are installed in the pipe. The expansion of the pipe then occurs in two or more steps. In the first step the diameter can for example be enlarged by 30%. In a second step by 20%.

The invention is in no way restricted to the embodiments described above, and within the scope of the patent application many changes can be applied to the described embodiments.

In particular it is also possible when only one high pressure hose is utilized to bring this hose in compressed state into the pipe and thereby to hold it in this state possibly by a stretchable covering during the insertion. Conversely with the utilization of 2 or more high pressure hoses the hoses can be brought into the pipe without compression. Their diameters are small enough prior to being put under pressure but with being put under pressure the hoses must increase sufficiently in diameter in order to expand the pipe.

I claim:

1. A method for widening a hole in the ground, comprising the steps of:
    a) inserting into the hole at least one high pressure hose having at least two layers of elastic material and an intermediate fabric layer of non-elastic threads which are weaved so that the threads form bundles of threads at an oblique angle with the axis of the hose and wherein the hose has a maximum radial expansion due to the fabric layer;
    b) pumping high pressure fluid into the hole to radially expand the two layers of elastic material so that the hose radially expands and engages with the hole thereby widening the hole;
    c) allowing the non-elastic threads to freely rotate in response to the radial expansion of the two layers of elastic material; and
    d) utilizing the non-elastic threads to prevent the hose from radially expanding beyond the maximum radial expansion.

2. The method of claim 1, further comprising the step of inserting at least one additional high pressure hose into the hole and adjacent to the other high pressure hose, wherein both of the hoses are radially expanded.

3. The method of claim 2, further comprising the step of holding the hoses together in the hole by surrounding the hoses with a radially expandable deformable covering.

4. The method of claim 1, further comprising the step of radially expanding the hose by pumping into the hose the high pressure fluid under a pressure of 100 to 7000 bars.

5. A method for renovating an underground pipe, comprising the steps of:
    a) inserting into the pipe at least one high pressure hose having at least two layers of elastic material and an intermediate fabric layer of non-elastic threads which are weaved so that the threads form bundles of threads at an oblique angle with the axis of the hole and wherein the hose has a maximum radial expansion due to the fabric layer;
    b) pumping high pressure fluid into the pipe to radially expand the two layers of elastic material so that the hose radially expands and engages with the pipe thereby widening the pipe;
    c) allowing the non-elastic threads to freely rotate in response to the radial expansion of the two layers of elastic material; and
    d) utilizing the non-elastic threads to prevent the hose from radially expanding beyond the maximum radial expansion.

6. The method of claim 5, further comprising the step of radially expanding the high pressure hose until the pipe breaks.

7. The method of claim 5, further comprising the steps of:
    c) lowering the pressure of the fluid in the high pressure hose; and
    d) leaving the hose in place, whereby the hose is used as a new pipe.

8. The method of claim 5, further comprising the steps of
    c) lowering the pressure of the fluid in the high pressure hose;
    d) removing the hose from the hole; and
    e) inserting a new pipe in the widened pipe.

9. The method of claim 5, further comprising the step of inserting at least one additional high pressure hose into the pipe adjacent to the other high pressure hose, wherein both of the hoses are radially expanded.

10. The method of claim 9, further comprising the step of holding the hoses together by surrounding them with a radially expandable deformable covering.

* * * * *